US007642909B2

(12) United States Patent
Acar

(10) Patent No.: US 7,642,909 B2
(45) Date of Patent: Jan. 5, 2010

(54) SYSTEM FOR REMOTELY MONITORING A PREMISE

(76) Inventor: Mustafa Acar, 3 Cabriolet La., Melville, NY (US) 11747

( * ) Notice: Subject to any disclaimer, the term of this patent is extended or adjusted under 35 U.S.C. 154(b) by 485 days.

(21) Appl. No.: 11/301,551

(22) Filed: Dec. 13, 2005

(65) Prior Publication Data

US 2006/0164234 A1 Jul. 27, 2006

Related U.S. Application Data

(60) Provisional application No. 60/641,211, filed on Jan. 4, 2005.

(51) Int. Cl.
*G08B 1/08* (2006.01)
*H04Q 7/00* (2006.01)

(52) U.S. Cl. ............................ 340/539.1; 340/539.16; 340/539.17; 379/159; 379/164; 379/167.01

(58) Field of Classification Search ....................... 340/539.16–539.17; 349/159, 164, 167.01; 379/37, 379/49, 164, 167.14
See application file for complete search history.

(56) References Cited

U.S. PATENT DOCUMENTS 7,228,429 B2 * 6/2007 Monroe ..................... 713/182
2003/0013503 A1 * 1/2003 Menard et al. ............. 455/569

* cited by examiner

*Primary Examiner*—Davetta W Goins
*Assistant Examiner*—Samuel J Walk

(57) ABSTRACT

A system and method for monitoring a premise in case of an emergency and enabling 2-way voice communications with an individual at every possible location within the monitored premises. The system utilizes a radio frequency 2-way wireless communication link from a centrally located Base Alarm Control Unit on the premise to plurality of Remote Alarm Control Units situated throughout the premise. Remote Alarm Control Units relay the information received from the wireless remote transmitters to the Base Alarm Control Unit thereby increasing the effective useful range of the wireless communication link. The same also establishes a 2-way voice connection between the Central Station operator and the individual who may be located at any possible location within the premise, thereby providing a much more effective handling of the emergency or alarm situation.

6 Claims, 14 Drawing Sheets

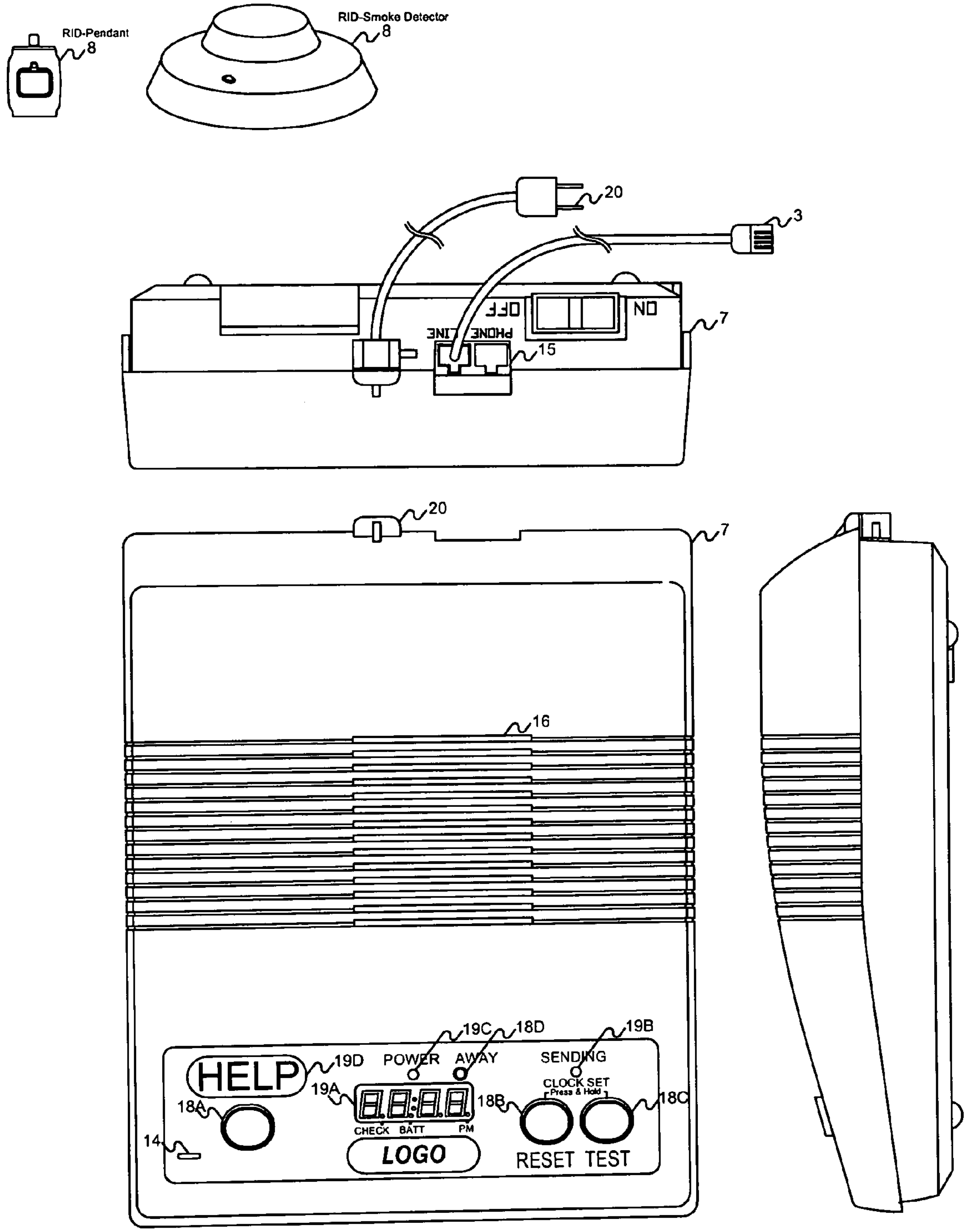
FIG.1- Plan View and Side View of preferred embodiment of BACU (Base Alarm Control Unit).

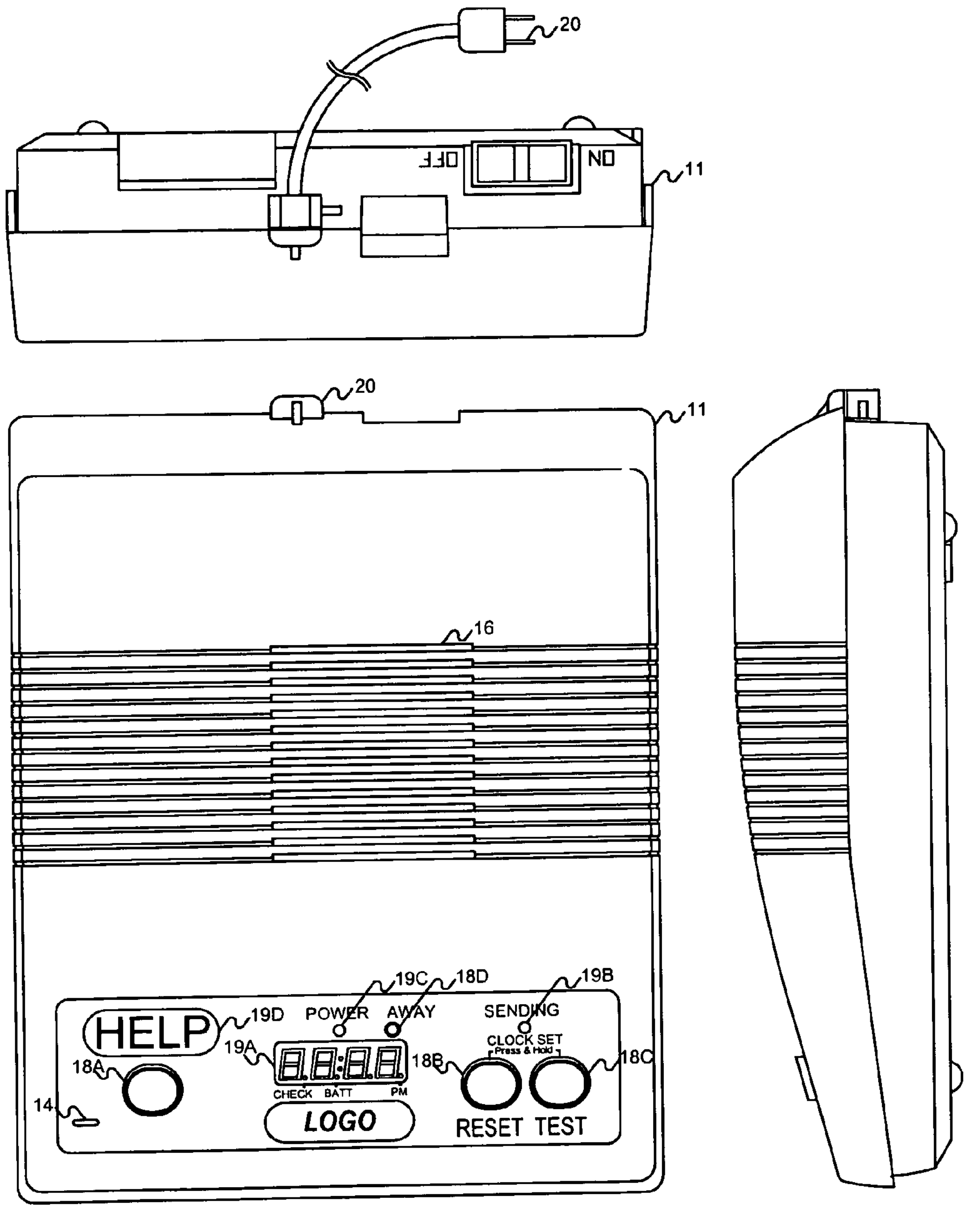
FIG.2- Plan View and Side View of preferred embodiment of RACU (Remote Alarm Control Unit).

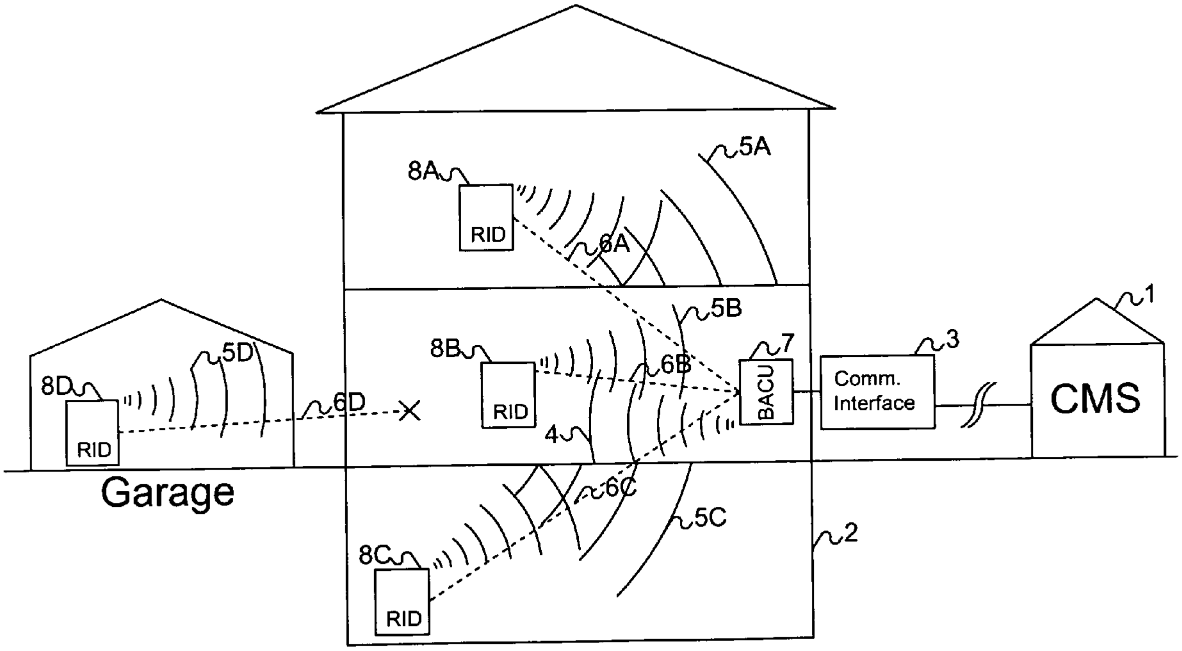
FIG.3- Block diagram for prior art.

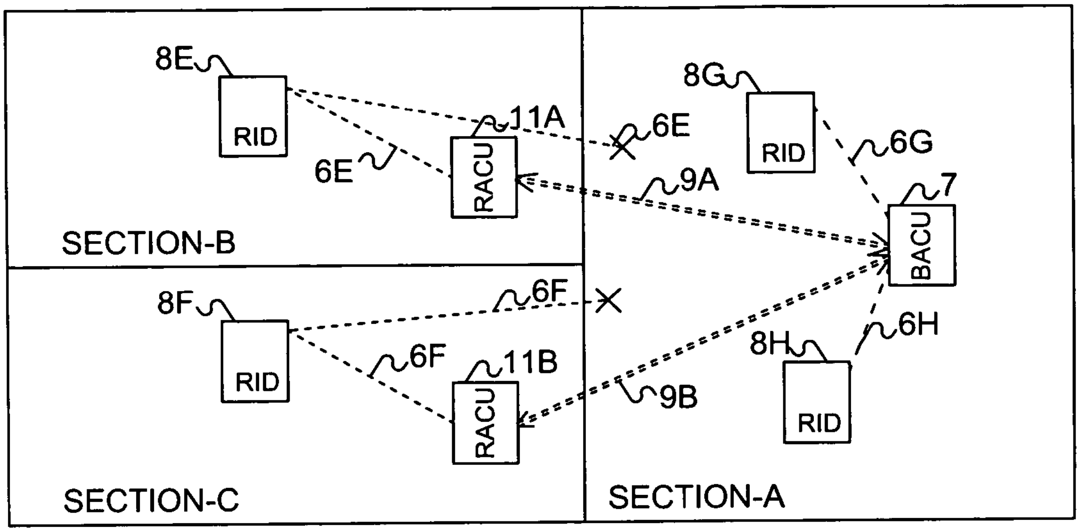
FIG.4A- Block diagram for Extended RF Range
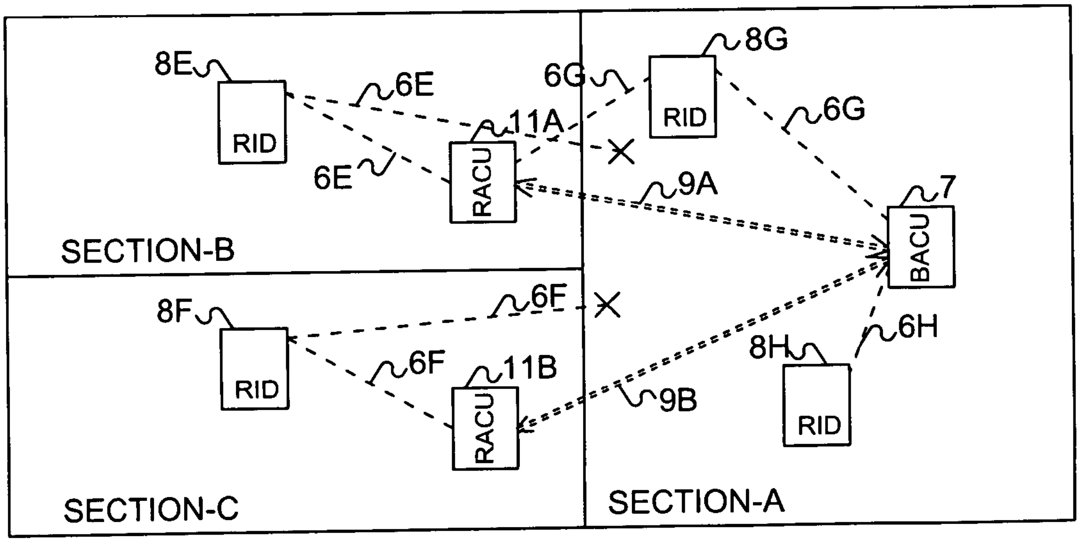
FIG.4B- Block diagram for Extended RF Range (for multi-path reception of RID signal)

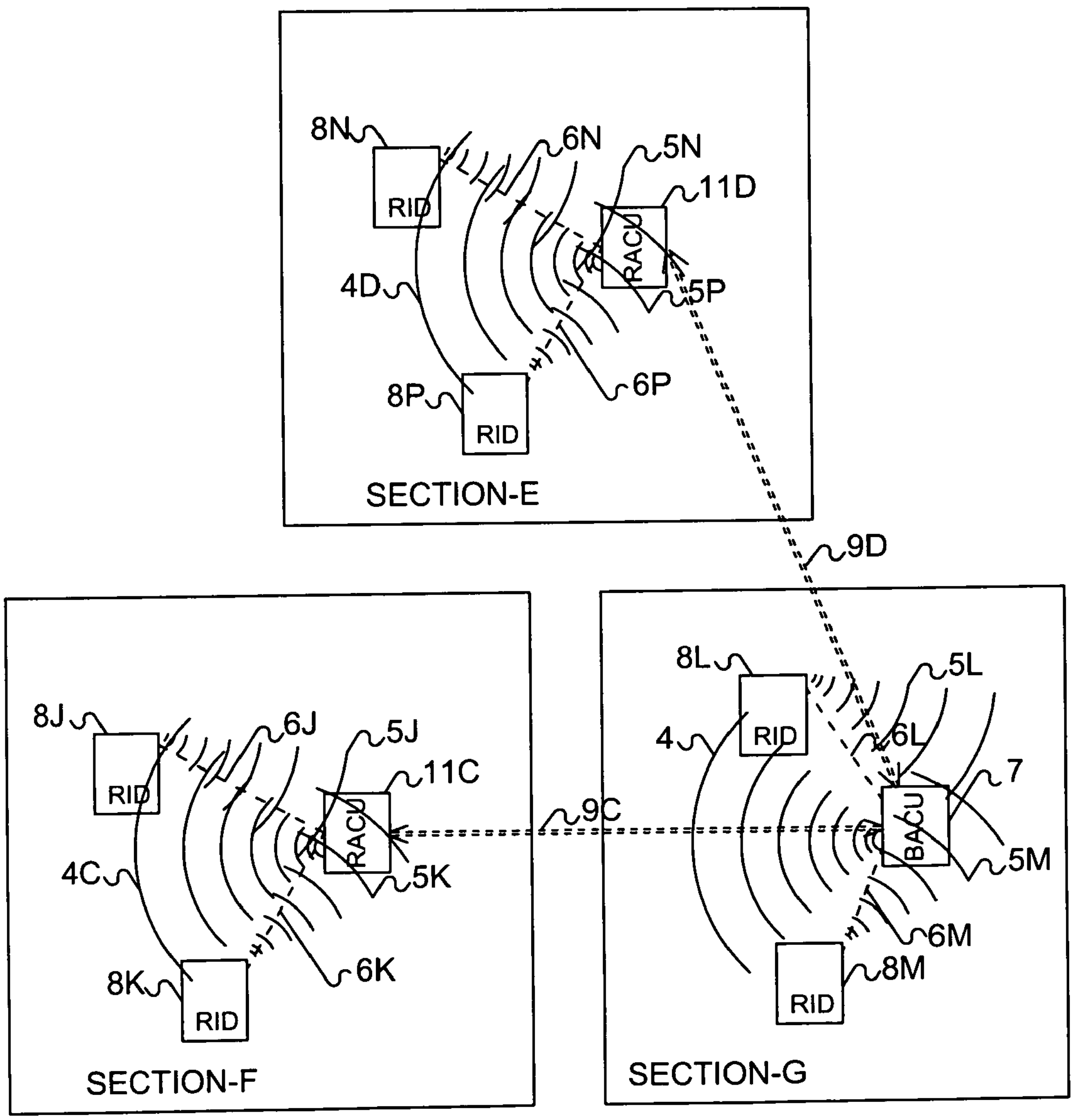
FIG.5- Block diagram for Extended Voice Range

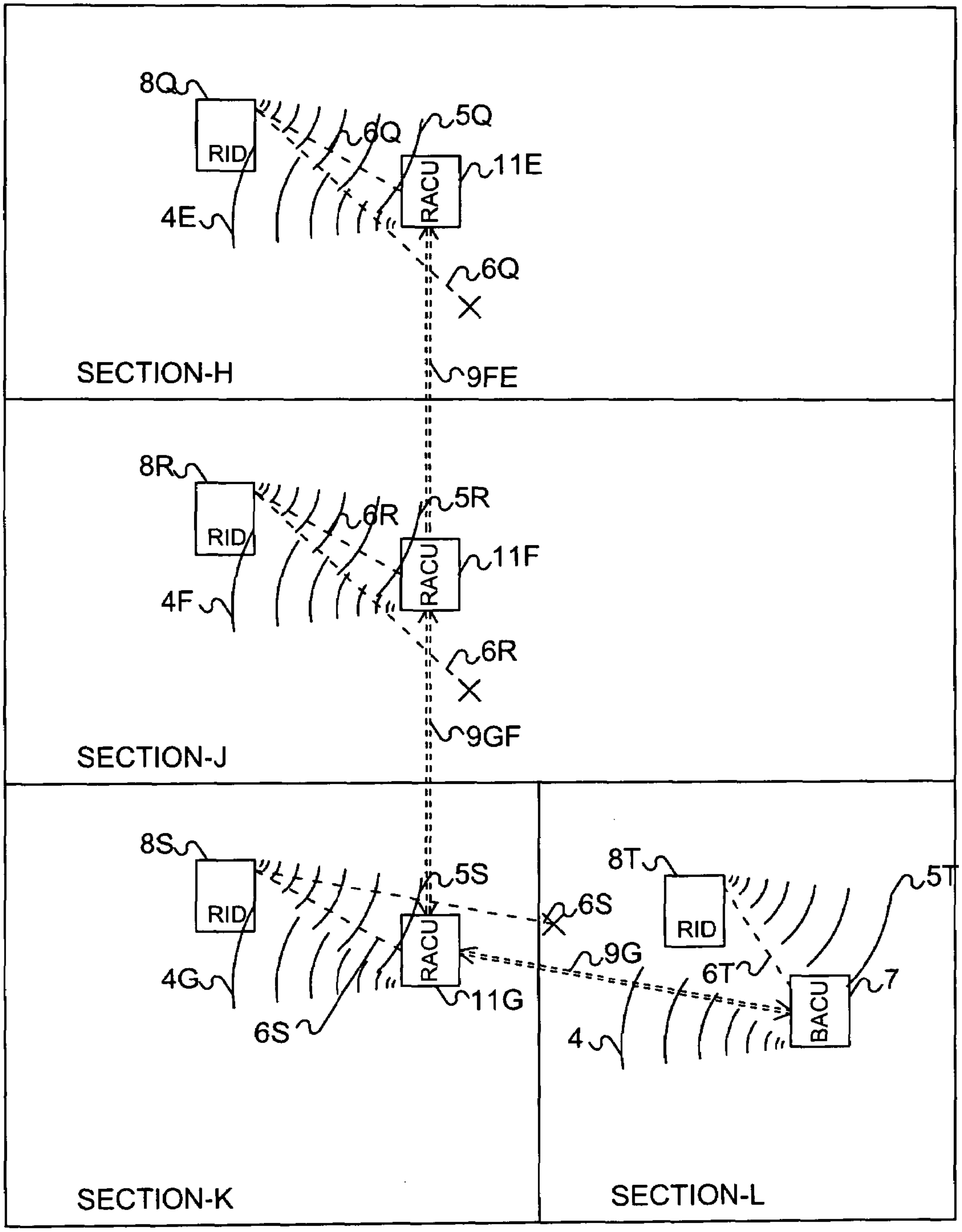
FIG.6- Block diagram for Daisy Chained RACU devices

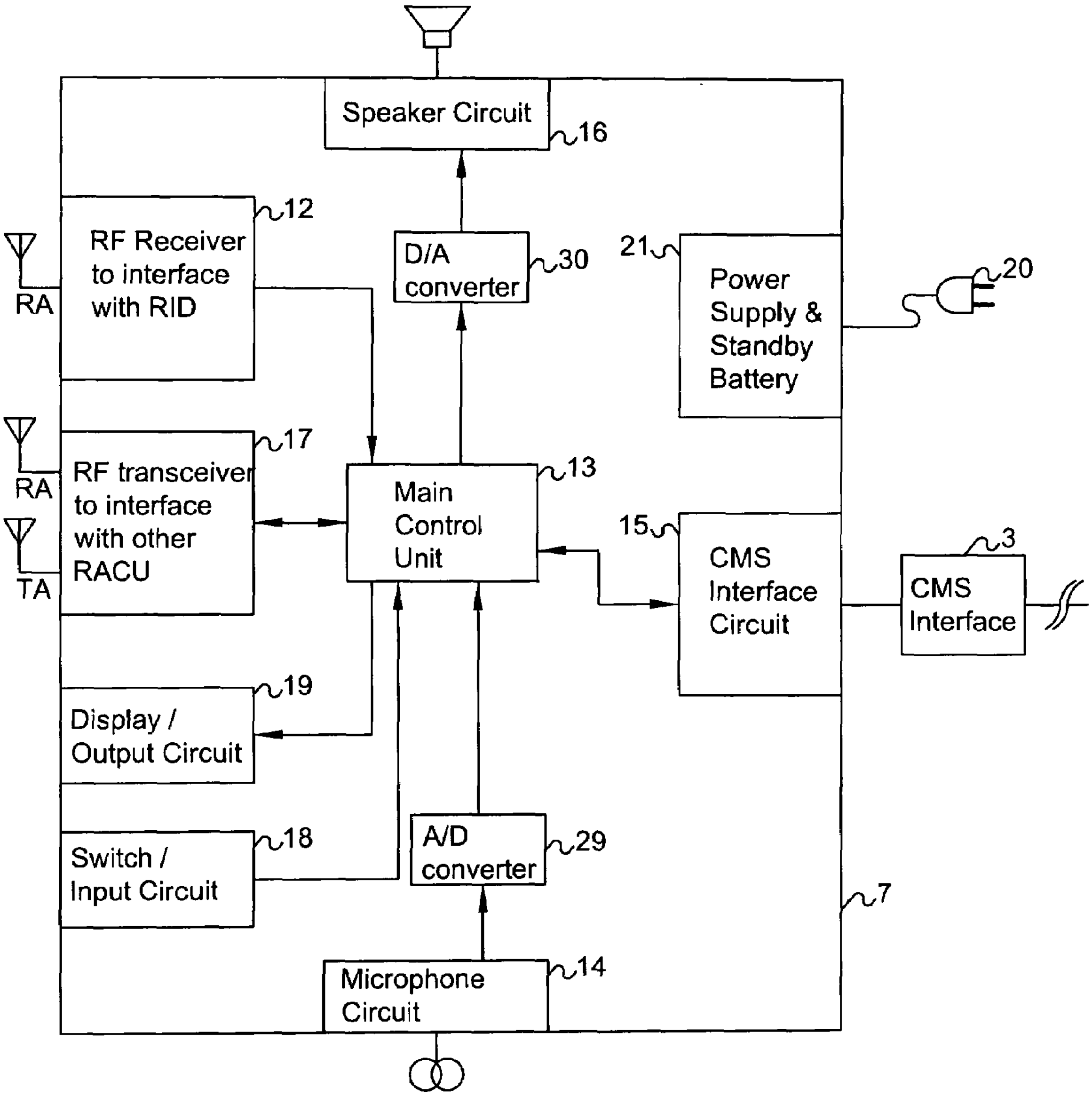
FIG.7- Block diagram for BACU (Base Alarm Control Unit)

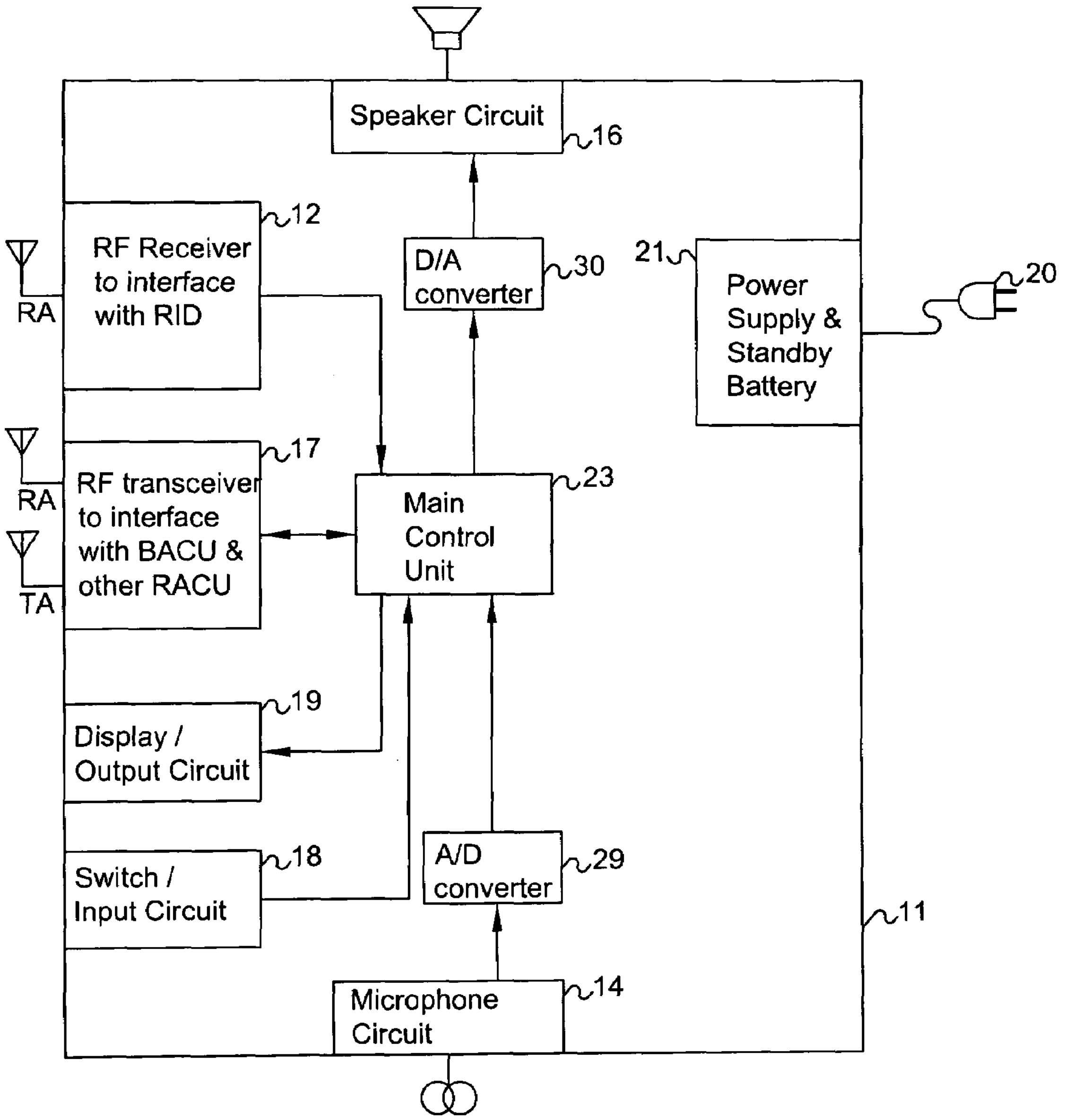
FIG.8- Block diagram for RACU (Remote Alarm Control Unit)

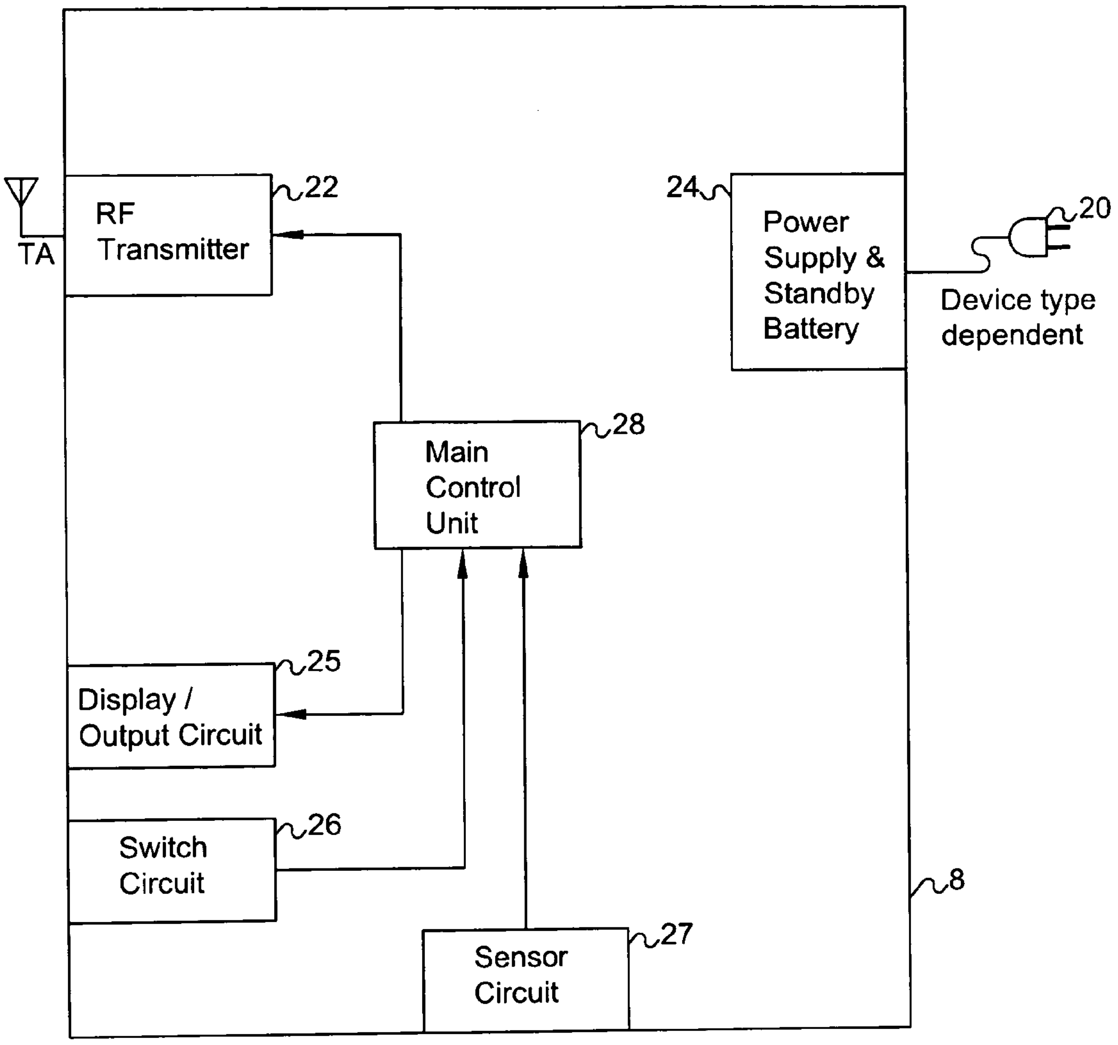
FIG.9- Block diagram for Remote Initiating Device (RID)

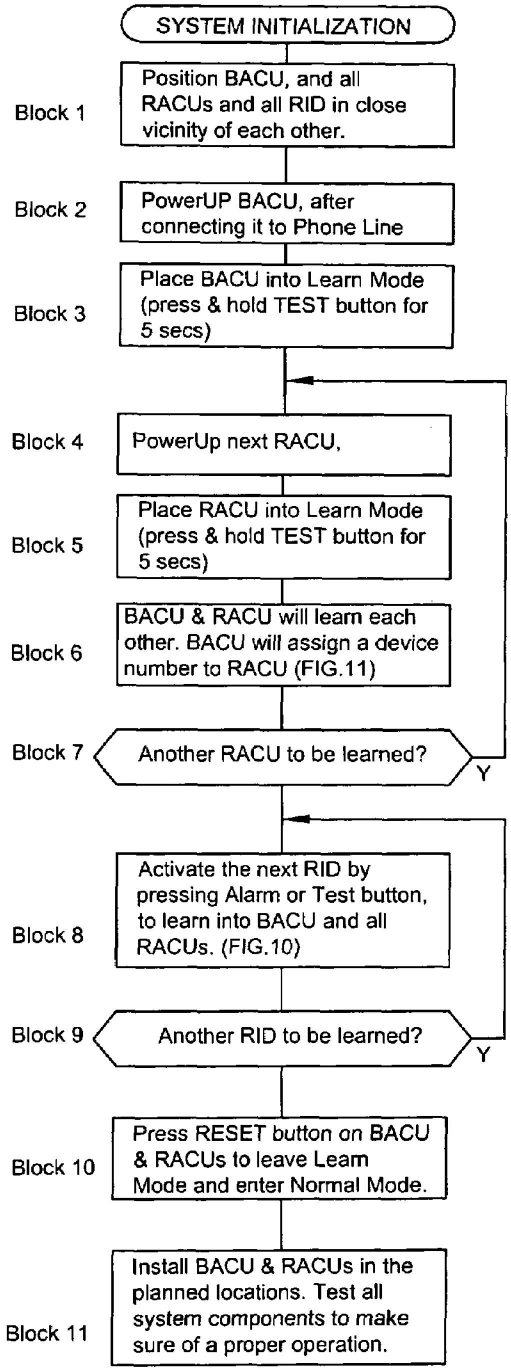
FIG.10- Flow diagram for Initial System Setup procedure.

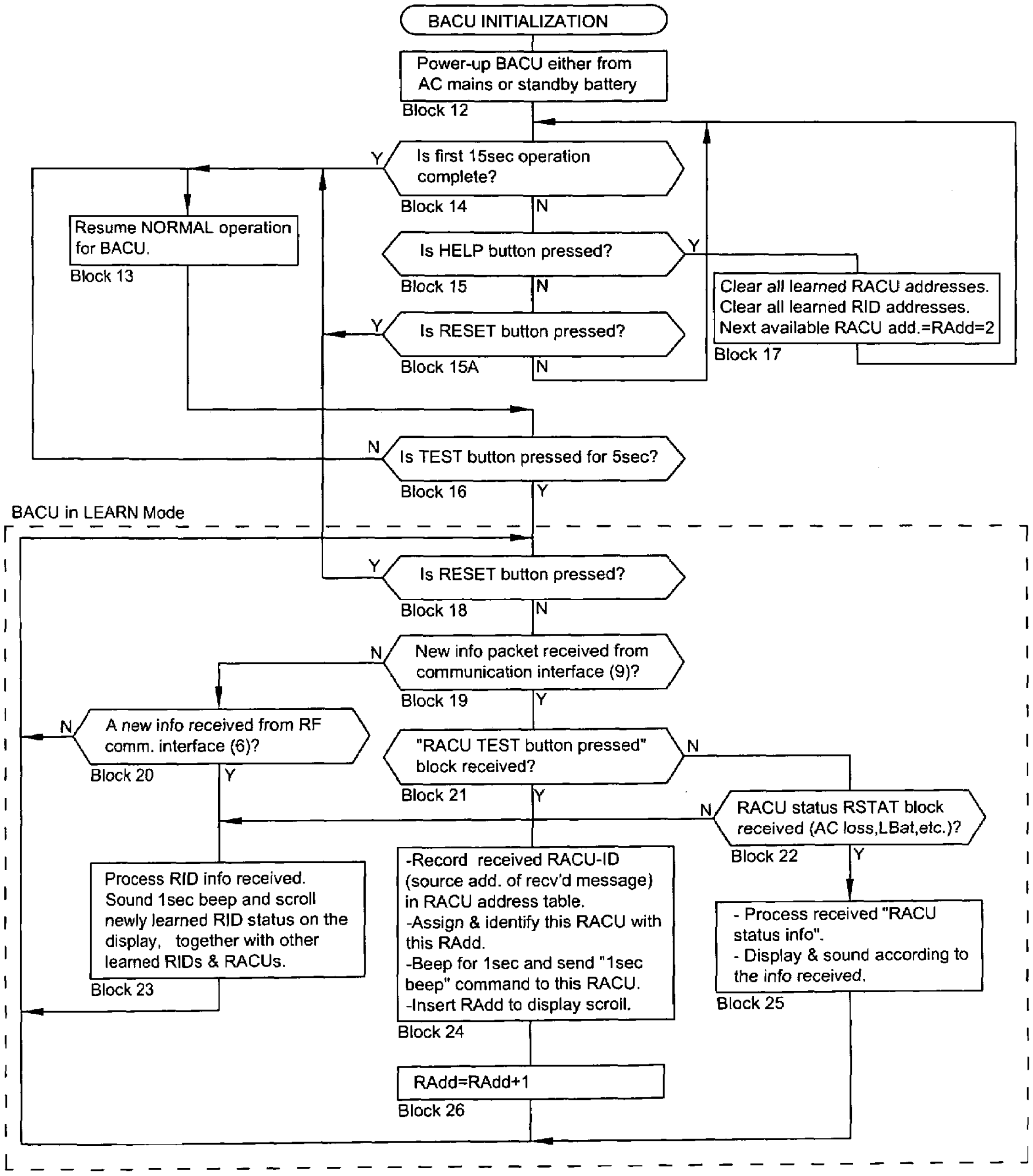
FIG.11- Flow diagram for BACU initialization and Learn Mode.

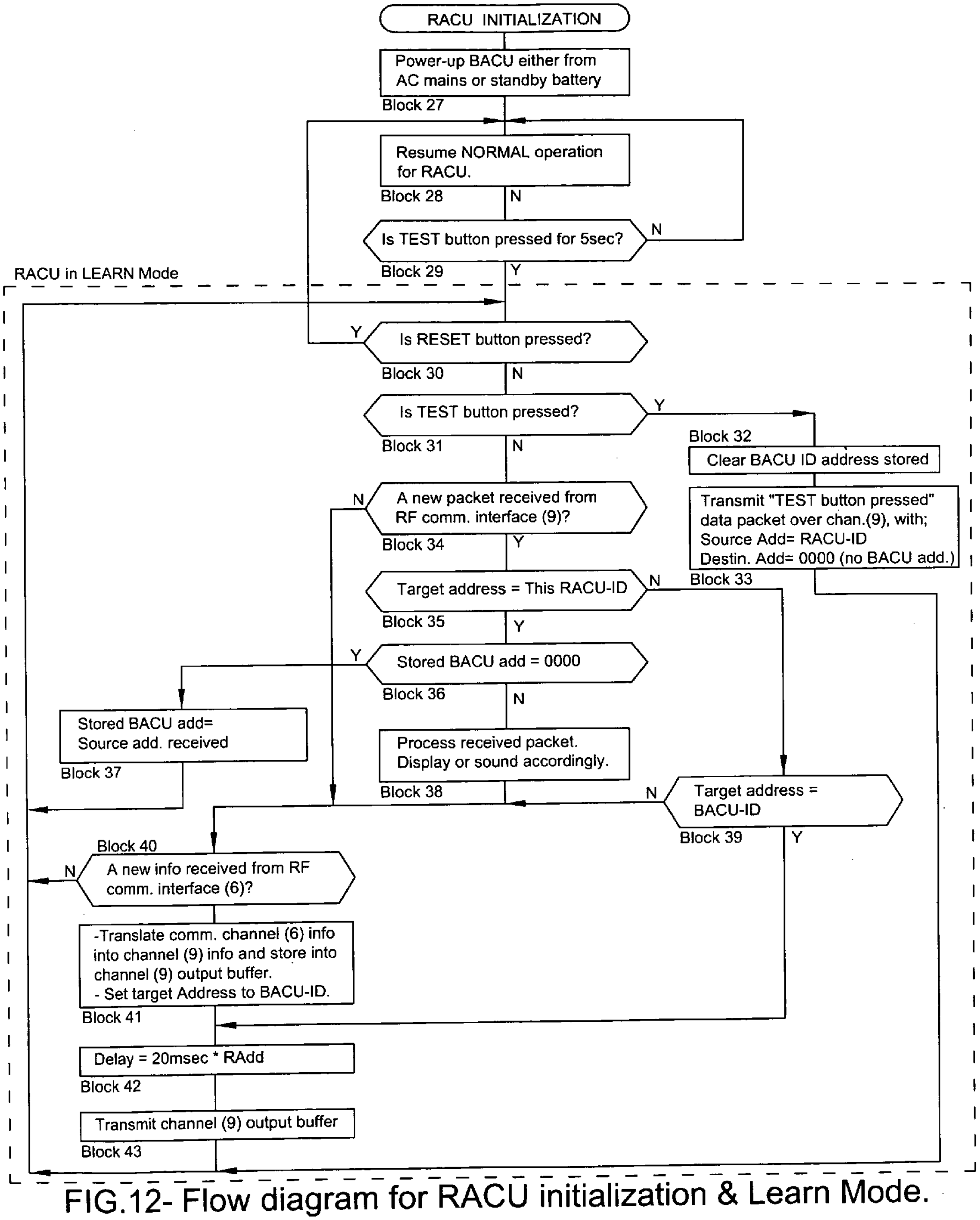
FIG.12- Flow diagram for RACU initialization & Learn Mode.

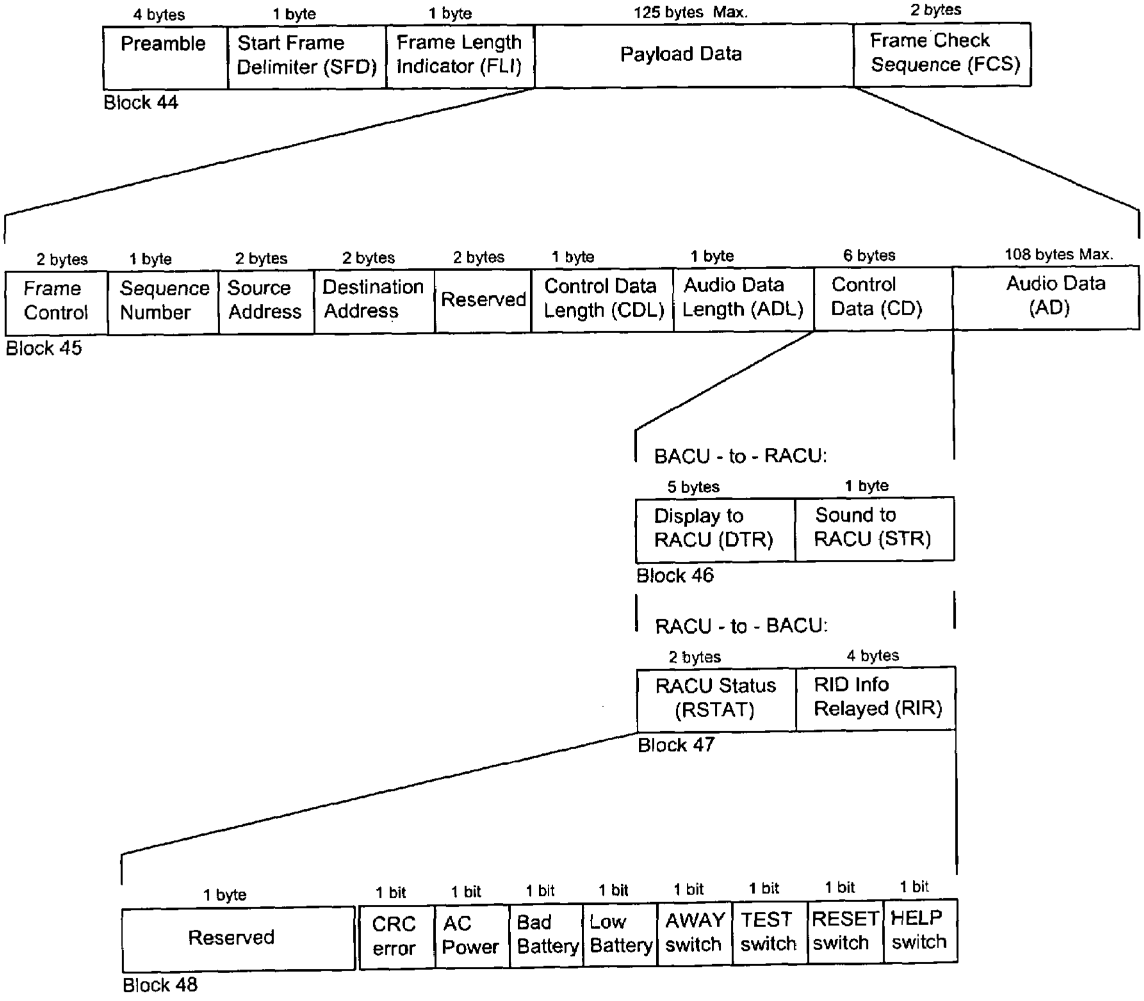
FIG.13- Communication Channel (9) Packet Data Structure

DISPLAY to RACU (DTR):

Byte Definitions:
Byte 0 : Digit 0 segment list
Byte 1 : " 1 " "
Byte 2 : " 2 " "
Byte 3 : " 3 " "
Byte 4 : " 4 " "

Bit Definitions:
bit 0 : segment a is On
bit 1 : " b " "
bit 2 : " c " "
bit 3 : " d " "
bit 4 : " e " "
bit 5 : " f " "
bit 6 : " g " "
bit 7 : " dp " "

Block 49

SOUND to RACU (STR):

Byte Definition:
aa000000 sounder off
aa000001 1-beep
aa000010 2-beeps
aa000011 3-beeps
aa000100 error beeps
aa000101 medical siren
aa000110 burglary siren
aa000111 fire siren
aa001000 voice prompt #1
aa001001 " " #2
.....
aa111111 " " #56 where:
aa= 00 min volume level
....
11 max volume level

Block 50

FIG.14- Display-to-RACU (DTR) and Sounds-to-RACU (STR) Data Structure

SYSTEM FOR REMOTELY MONITORING A PREMISE

This application claims priority from provisional application entitled, "SYSTEM FOR REMOTELY MONITORING A PREMISE", Application No. 60/641,211, filed Jan. 4, 2005, the entirety of which is incorporated herein by reference.

BACKGROUND OF THE INVENTION

Any personal emergency response system or burglary/fire alarm system that exists today consists of a single alarm control unit located at the premise being monitored. This control unit is usually connected to a central monitoring station via one of the possible communication links in order to report a multitude of alarm, emergency or status signals. Multiple emergency or alarm remote initiating devices, whether they are fixed or portable, are used to initiate and convey an emergency or an alarm condition to the alarm control unit.

Some of these alarm control units have 2-way voice capability, containing a microphone and a speaker, capable of transferring the voices and sounds at the premises to the central monitoring station, and the voice of the central station operator to the people within the premise. It is known that remote wired speaker/microphone devices are available as attachments to some of the existing 2-way voice alarm systems. However in these systems, emergency RF signaling and 2-way voice communication has limited capabilities at best.

In the present invention, it is shown that by using multiple remote alarm control units as defined, not only extends the effective RF range of the remote initiating devices, but also the 2-way voice capability of the system is dramatically improved.

SUMMARY OF THE INVENTION

According to one embodiment of the invention, a Remote Alarm Control Unit (RACU) is established in order to extend the effective radio frequency (RF) range of the Remote Initiating Device (RID). A RACU device has a build-in RF receiver and transmitter and follows a signaling method in compliance with a communication protocol between RID and RACU and also between RACU and Base Alarm Control Unit (BACU). Pluralities of RACU devices are logically placed throughout the premise. Upon an emergency or alarm condition, the RF signal transmitted by a RID device is received by the RF receiver of the RACU and then in turn re-transmitted by the RF transmitter of the RACU. The emergency or alarm signal received by the RACU from the RID will be translated into a new format before it is retransmitted so that it would be compatible with the communication format between the RACU and the BACU. This implementation thus allows a said emergency signal from RID which normally would not be received directly by the BACU, to be received because of the multiple retransmitting of the said RID signal from RACU to RACU, until it reaches a BACU.

According to a further embodiment of the invention, a Remote Alarm Control Unit (RACU) is utilized in order extend the effective range of the 2-way voice communication between the remote Central Monitoring Station (CMS) and plurality of the individuals within the premises. A RACU device has build-in microphone and speaker, as well as build-in radio frequency receiver and transmitters and follows a signaling methods in compliance with a communication protocol of between RACU and BACU as well as with the signaling method between RID and RACU. Multiple RACU devices are placed at different locations within the premise that is being monitored. In case of emergency or alarm condition, and upon BACU establishing a connection between the CMS and the premise, then the 2-way voice communication is passed on from the BACU to the plurality of the RACU devices. This implementation thus allows the CMS operator to be able to carry a 2-way communication with a person located at any point in the monitored premise.

According to a further embodiment of the invention, the emergency or alarm signal transmitted from the RID, as well as the 2-way voice communication signals to and from a user located at any location within the premise may be received and retransmitted in both directions multiple times between plurality of RACU devices, until the said RF or audio signals are finally received/transmitted by the BACU device. Then such information is conveyed to and from the CMS by the BACU device. Therefore, a Remote Alarm Control Unit (RACU) is established in order to have wireless communication between one RACU device and another RACU device. A RACU device has build-in RF receiver and transmitter and follows a signaling method in compliance with a communication protocol between RACU and another RACU.

According to another embodiment of the invention, it is possible to design the BACU and the RACU, so that they can function interchangeably. During the initial setup of the system, a device built as a BACU can automatically or manually reconfigures itself to function as a RACU. Therefore, it is not necessary to manufacture two different types of devices, one functioning as BACU and other functioning as RACU. Even though this method may be more expensive to implement because of the cost of unutilized hardware circuitry in RACU for the CMS communication, however the simplicity of system installation and cost savings involved handling only one type during manufacturing may easily overcome this disadvantage.

Yet according to another embodiment of the invention, it is possible to design the BACU and RACU, so that they contain a visual display that can be used as a clock to show the real time of the day for that premise. The display will show the real time when there is no other information to display pertinent to BACU or RACU. Also, the user can easily press two buttons simultaneously on the BACU that in turn communicates using with the central monitoring station and receives the updated time information for that location.

BRIEF DESCRIPTION OF THE DRAWINGS

FIG. 1 shows Plan and Side View of preferred embodiment of BACU (Base Alarm Control Unit). It also shows few of the typical RID (Remote Initiating Device), such as medical pendant transmitter and smoke detector.

FIG. 2 shows Plan and Side View of preferred embodiment of RACU (Remote Alarm Control Unit).

FIG. 3 is a block diagram for prior art, 2-way voice alarm system not utilizing the capability presented in this invention.

FIG. 4 is a block diagram of a 2-way voice alarm system utilizing the capability presented in Paragraph 1, where the effective RF range is extended.

FIG. 5 is a block diagram of a 2-way voice alarm system utilizing the capability presented in Paragraph 2, where effective voice range is extended.

FIG. 6 is a block diagram of a 2-way voice alarm system utilizing the capability presented in Paragraph 3, where both RF and voice range is extended.

FIG. 7 is an internal block diagram of a typical BACU (Base Alarm Control Unit).

FIG. 8 is an internal block diagram of a typical RACU (Remote Alarm Control Unit).

FIG. 9 is a block diagram of a typical RID (Remote Initiating Device).

FIG. 10 is a flow diagram for Initial System Setup Procedure.

FIG. 11 is flow diagram for BACU Initialization and Learn Mode.

FIG. 12 is flow diagram for RACU Initialization and Learn Mode.

FIG. 13 is Communication Channel (9) Packet Data Structure.

FIG. 14 is Display-to-RACU (DTR) and Sounds-to-RACU (STR) definitions.

DETAILED DESCRIPTION OF THE PREFERED EMBODIMENTS

The preferred embodiments of the present invention will hereinafter be described in conjunction with the appended drawings, wherein like designations denote like elements, and further wherein:

Emergency systems are often monitored remotely, and information between the monitored premise and the remote monitoring station is transferred back and forth over the existing telephone lines or cellular telephone networks or over long-range wireless communication links or even using the Internet connection.

It is desirable during an alarm or emergency situation to remotely listen to what is going on in the premise and talk back and forth with the plurality of individuals within the premise.

Referring now to the drawings, the FIG. 1 shows preferred implementation of Base Alarm Control Unit (BACU) (7). The unit has plastic enclosure around the electronic circuitry and system standby battery. User can observe the system visual responses through different display elements (19), whereas system audio responses are heard through the built-in speaker (16). The sounds are detected by sensitive microphone (14) located on the BACU. User can interface with the system by using various switches HELP(18A), RESET(18B), TEST (18C) and AWAY(18D). Unit is normally plugged to an AC mains outlet (20) to charge internal standby batteries. All antennae are enclosed inside the plastic enclosure and therefore not visible.

The BACU has 4-digit display that not only shows all the pertinent information related to BACU and all RACU, but also it doubles as a clock for the user. When there is no other information to display, this display shows the real time for that location. The local time information will be automatically updated by using Caller-ID feature, if available, when the premise is receiving an incoming phone call. Otherwise, the user can request updated time information by pressing and holding RESET and TEST buttons simultaneously. The BACU will connect with central monitoring station automatically and updated local time will be downloaded for display.

The FIG. 2 shows preferred implementation of a Remote Alarm Control Unit (RACU) (11). For all practical purposes, a RACU is identical to a BACU. The only difference between a RACU and a BACU is the absence of the communication interface circuitry on RACU, which in the depicted implementation is the telephone line connection (15). Then a RACU will duplicate all the functionalities of the BACU input switches and out displays. As an example, the system will respond exactly the same way, whether the TEST switch is pressed on the BACU or on the RACU. Similarly, all display elements on a RACU will be identical to what is being displayed on the RACU. As a summary, it can be said that all RACU will be extension of the BACU throughout the premise being monitored.

FIG. 3 shows a prior art 2-way voice alarm system having a BACU (7) monitoring a premise (2) and positioned logically so that it is close to the CMS communication link interface (3) as well as close to an AC power outlet. In an illustrative embodiment, the BACU (7) might be positioned in a closet or may be a tabletop model and positioned on a kitchen countertop or a bedroom nightstand.

The BACU (7) communicates with the remote Central Monitoring Station (CMS) (1) either via the Public Switched Telephone Network (PSTN) or via a cellular phone network or via a long-range radio network or via the Internet or via any combination thereof. The CMS communication interface in totality will be referred to as CMS communication link (3).

FIG. 3 also shows that pluralities of Remote Initiating Devices (RID) (8A, 8B, 8C, 8D) are included in the system. Alarm or emergency situation is conveyed to the BACU (7) either by manually pressing one of the buttons on the BACU or by activating any of the plurality of the wired or wireless RID (8*x*). These RID may be located at a fixed location within the premise (such as smoke detectors, motions sensors, gas detectors, level detectors, etc). Otherwise a wireless portable RID may be worn or carried by an individual within the premise and in case of an emergency, when the individual is not able to reach the BACU, a button on the RID can be pressed. An emergency signal is then sent to the BACU via radio frequency link (6) between the BACU and the RID.

This wireless communication link (6) may be implemented by using one of the well established radio frequency modulation and demodulation techniques, such as amplitude modulation (AM), frequency shift keying (FSK), on off keying (OOK), etc. Anybody who is knowledgeable in this field of the art and sciences may choose any one of the possible methods. The operation frequency may be at any allowable frequency band at the country of implementation. Therefore the details of this communication link will not be reviewed in this document.

Also any or all of the RID may send periodic supervisory signals (6) to report the status of the RID, such as battery level, detection circuit sensitivity level, tamper, etc.

It is known to place microphone circuitry in the BACU to "listen-in" the sounds (5) within the premise as well as to place a speaker circuit to establish a means to regenerate the voice (4) of the remote central station operator.

Upon receiving the alarm or emergency signal from RID (8), the BACU (7) in turn establishes a connection between the premise and the remotely located Central Monitoring Station (CMS) (1), either via telephone line connection or cellular telephone network or via a long range wireless link. The BACU first automatically reports the incident electronically to the CMS receiver. Then a 2-way communication link between the CMS and the premise is established. A dispatcher at the CMS is then able to directly communicate with the plurality of individuals within the premise using the microphone and speaker located within the body of the BACU, in order to establish and ascertain the nature and the level of seriousness of the alarm or emergency situation. In turn, appropriate emergency authorities are summoned for help, as well as family members, neighbors, friends and others are notified.

Upon establishing a 2-way voice link between the BACU and the CMS, the CMS operator uses predetermined tone combinations in order to control and change the direction of communication between the operator and the customer (between Talk and Listen). Either normal sensitivity "hands free"

operation or the enhanced sensitivity "Push-to-Talk" operation may be selected by the CMS operator for the type of voice communication between the operator and the user. CMS operator always has the capability to control the direction of the communication. CMS operator also has the capability to issue other special commands (such as turning on the local siren sounds at the BACU, activating auxiliary outputs or inputs, etc.).

BACU conveys the emergency or alarm condition to the CMS, when a predetermined event has occurred, such as fire alarm, medical emergency, burglary alarm, etc. Similarly, BACU may be programmed to convey an emergency condition to the CMS, when a signal or a user initiated manual intervention has not been received by the BACU within a predetermined period of time. Such a condition may be activated, for example, when BACU detects no activity of a person within a specified time period, for example 24 hours, because of either a failure of a motion sensor to detect movement of a person or absence of a manual pressing of a button on the BACU. In this case, BACU reports to the CMS an "inactivity alarm" upon which a certain predetermined procedures can be initiated to ascertain the health condition of the individual or individuals within that premise, and take necessary actions. Proper emergency services, as well as neighbors, relatives, friends and so on, may be notified according to a predetermined list of procedures.

In a different scenario, BACU may be programmed so that a manual user intervention is required within a certain time period, in order to prevent an alarm reporting to the CMS. By way of example, BACU may be utilized as to remind the user to take medication at certain hours of the day. Then in turn, the user may be required to manually press a button on the BACU, in order to silence the warning beeps emanating from the BACU, and thus acknowledging that the user has taken the medication within the predetermined time period. If the user fails to manually press the button on the BACU, then a "failure of taking medication" condition is reported to CMS. The operator may then warn or remind the user to take medication, through the use of the system described.

By way of another example, BACU may be utilized as a sentry clock. A sentry may have to manually press a button on the BACU, not only at a certain time interval, but also upon a random warning beeps emanating from the BACU. When a failure of such manual intervention is detected, a similar CMS reporting is generated by the BACU.

In all above examples it becomes clear that it is quite important to establish a good 2-way communication between any point in the monitored premise and the CMS as well as a good wireless link between the BACU and plurality of the RID. However, in many instances, a centrally located BACU, no matter how cleverly or how professionally located, is not capable of receiving wireless signals from all of the RID, or pick-up sounds from every location of the monitored premise via the microphone or be able to convey the speech of the CMS operator to every corner of the premise via the speaker.

Also in FIG. 3, one of the more important limitations of prior art alarm systems is depicted showing that in a multi floor environment or detached orientation of a section of the premise, the CMS sounds (4) regenerated by the speaker of BACU (7) can't pass through the flooring or the walls. Similarly, the sounds present at different sections of the premise (5A, 5C and 5D) can't reach to the microphone of BACU (7) and therefore won't be conveyed to the CMS.

It is theoretically possible to extend the range of the speaker (16) or the microphone (14) of the BACU (7) by hard wiring between any point of the premise under question and the BACU (7). However, in almost all implementation of this method, the cost of labor involved in laying the wires or the appearance of the premise after such wiring make it extremely cost ineffective or undesirable to implement this approach.

Even though it is conceivable to have multiple BACU devices to be installed in one premise in order to circumvent these problems, other problems are faced in trying to do so. In most of the cases, it is very difficult to bring telephone lines to every corner of the premise, which is very labor intensive and therefore costly. Even in those cases where multiple BACU units could be connected to telephone lines or to other communication media, then these multiple BACU units step over at each during emergency in order to connect and report the same alarm to the CMS picked up multiple BACU. Therefore, it is completely impractical to use multiple BACU units within one monitored premise using the same communication link to the CMS. Trying to use multiple BACU units with independent and separate communication links makes it very cost prohibitive.

In FIG. 4A, the capability of the invented system to extend the effective RF range of the monitoring system is depicted. It shows that, even though a nearby RID (8G and 8H) are capable of establishing a wireless link directly with the BACU (7), however, distant RID (8E and 8F) are not able to directly connect with the BACU (7). Instead, these distant RID (8E and 8F) are able to establish a wireless link to Remote Alarm Control Unit (RACU) (11A and 11B). These remote alarm control units in turn make the wireless connection (9) with the BACU (7) and thereby able to provide an indirect communication link between distant RID (8E and 8F) and the BACU (7).

In FIG. 4B, a situation where a multi path reception is the case. The channel (6) signals transmitted by RID (8G) may reach to BACU both directly and indirectly via the transfer of RACU (11A). In this case, BACU will have the necessary intelligence to decide and act upon on the received RID (8G) signal only once.

Both in FIG. 4A and FIG. 4B, an in all the other figures which depicts the communication channel (9), the bidirectional wireless communication link (9) may be implemented by using one of the established radio frequency modulation and demodulation techniques. Anybody who is knowledgeable in this field of the art and sciences may choose any one of the possible methods. The operation frequency may be at any allowable frequency band at the country of implementation. In one of the preferred embodiment of the invention, the communication link (9) can be implemented by utilizing an off-the-shelf chipsets. For example, MC13191 is a low power, 2.4 GHz Industrial, Scientific, and Medical (ISM) band transceiver. The MC13191 contains a complete packet data modem, which is compliant with the IEEE 802.15.4 Standard PHY (Physical) layer. This allows the development of propriety point-to-point and star networks based on the 802.15.4 packet structure and modulation format. Therefore the details of this communication link will not be reviewed in detail at this point.

However, it must be pointed out clearly that, these chipsets provide only the lowest layer (Physical layer) communication link between two devices. This point is represented in FIG. 13. The chipsets mentioned above provide and control the envelope shown in Block 44. The "Payload data" portion of this block is what is determined and controlled by the application programs contained within the BACU and a RACU. It is necessary and sufficient to state here that this wireless communication link (9) will carry back and forth audio information as well as bidirectional digital Control Data between RACU-to-BACU and also between RACU-to-RACU.

As a way of example, FIG. 13, Block 45 shows that each packet of information has; a source address, a destination address, length of the "control data", length of the "audio data", "control data" and finally "audio data". Other parts of this block are used in order to control the traffic and verify the correctness of the packet being sent.

In FIG. 13 and FIG. 14, Blocks 46-50, the details of the information that are being sent for a BACU-to-RACU communication, as well as for a RACU-to-BACU communication. Block 46 shows the display information (DTR) and sound information (STR) that is provided from BACU to each or all RACU. Similarly, Block 47 indicates the RACU status information (RSTAT) and also the received RID information (RIR) that are transmitted to the BACU. For this preferred embodiment of the invention, in blocks Block 48-50, individual bits of information for each switch input or display output is clearly defined.

Even though it is conceptually possible to implement the system using the same protocol and hardware for both of communication channels (6) and (9). However, for all practical purposes, the cost of implementing communication link (9) will be higher than that of communication link (6). Also hardware implementation of the communication link (9) is usually heavier and bulkier in weight, and also uses more electrical power. This condition is not very conducive for a portable pendant transmitter, where normally a user prefers a smaller, a less obtrusive pendant device with a long battery life. Therefore, the present invention assumes a separate communication protocols for communication channels (9) and communication channels (6).

In FIG. 5, the capability of the invented system to extend the effective sound retrieval or regeneration capability of the monitoring system is depicted. It shows that, the microphone (14) of the BACU is capable of picking up all the sounds (5L and 5M) within the Section-G of the monitored premise (2). Also, any person inside Section-G can hear the sounds (4) generated by the speaker (18) of the BACU (7). However, neither the sounds (5J and 5K) from Section-F can be heard directly by the microphone of BACU, nor the sounds (4) generated by the speaker of the BACU can be heard directly by the user located in Section-F. Only because of the presence of the RACU (11C) located in Section-F, this bi-directional audio information is wirelessly carried in and out of the BACU (7), by using the RACU-to-BACU communication protocol (9C). It is clear that, a similar application will be valid if there are multiple isolated sections within the monitored premise and multiple RACU devices are positioned within each of these isolated sections. Similar descriptions will be valid for RID and RACU located within Section-E.

In FIG. 6, the capability of the invented system to extend the effective RF range as well as effective Voice range of the monitoring system using a RACU-to-RACU communication (9FE and 9GF) capability is depicted. In this application, multiple RACU devices are physically located to form a daisy chain. As a way of example, an extremely remote RID (8Q) sends an emergency or alarm signal which is picked up by RACU (11E). This information is then transmitted again to the next RACU down the line, and so on, until the transmissions from the last RACU (11G) is received by the BACU (7). Then BACU makes the connection to the CMS (1) to start the 2-way voice communication and CMS operator can communicate with the user located near the RID (8Q).

BACU Devices:

In FIG. 7, internal building blocks of a Base Alarm Control Unit, BACU (7) is shown. This block diagram explicitly indicates the presence of the radio frequency (RF) transceiver (17) in order to accomplish the wireless communication (9) between BACU and RACU. This transceiver section (17) is not present in a prior art alarm system. A typical alarm system that exists today includes only an RF receiver (12) in order to establish communication channel (6) between RID and the BACU. For clarity sake, in this and all other drawings, all antennae are shown separately, even though it is possible to merge receiving and transmitting antennae together. In these drawings RA refers to a "receiving antenna", whereas TA refers to a "transmitting antenna".

In FIG. 7, a Base Alarm Control Unit (BACU) (7) consists of following building blocks; Power Supply circuitry (21) which is connected to AC power mains (20) to supply power to the device in the presence of AC power. However, when AC power is lost, the BACU has built-in backup batteries in order to continue proper operation of the BACU. A microprocessor or digital signal processor (DSP) based Main Control Unit (MCU) (13) generally performs all the logic and control functions of the BACU. The MCU has appropriate permanent memory for storing program instructions and other information, and a programmable memory for storing user programmable functions. Preferably, the programmable memory is of the non-volatile type. The microprocessor or DSP (13), memory units, CMS communication interface circuit (15), display circuitry (19), user interface switches (18), speaker circuitry (16), microphone circuitry (14) and RF circuitry to interface with RID devices (12) are coupled together in a conventional manner and therefore will not be further described. The communication interface circuitry (15) provides a connection with the CMS Interface (3) via using plurality of the public switched telephone network (PSTN) or via cell phone network or via long-range radio transceiver. A built-in D/A converter is used to convert the digital signals coming from the MCU (13) to derive the speaker circuit (16). Similarly, an A/D converter is used to convert the microphone circuit output into digital format so that it can be supplied into the MCU (13).

During the manufacturing process, each of the BACU devices is assigned with a unique digital address to uniquely identify these devices. This device address may be up to millions of different combinations of bits. This unique address information is stored in non-volatile memory of the BACU. During communication channel (9) transmission this unique address of the BACU is appended to the digital information that is being transmitted. Upon learning this unique BACU address at the initial system setup (FIGS. 10, 11 and 12), all other RACU will communicate with only this BACU, and not with another BACU that may be located in a nearby location.

RACU Devices:

In FIG. 8, internal building blocks of a Remote Alarm Control Unit, RACU (11) is shown. This block diagram explicitly indicates the presence of the radio frequency (RF) transceiver (17) in order to accomplish the wireless communication between BACU and RACU, as well as communication between RACU and RACU.

In general, a Remote Alarm Control Unit (RACU) (11) is almost identical to BACU (7), except for the CMS interface circuitry (15) of the BACU. A RACU device does not need or use this CMS circuitry. However, all other aspects of RACU and BACU are similar in character and functionality. Therefore, a BACU device can be used also as a RACU device. In that case, during the system setup, a BACU device can be forced to function as a RACU, after seeing that the BACU is not connected to a CMS interface. But for all practical purposes, since such CMS interface circuitry (15) is not required or used by RACU, a simpler and thus cheaper hardware device can be built to implement the RACU. For preferred embodiment of this invention, a separate RACU and BACU will be considered.

During the manufacturing process, each of the RACU devices is also assigned with a unique digital address to uniquely identify these devices. This device address may be up to millions of different combinations of bits. This unique address information is stored in non-volatile memory of the RACU. During communication channel (9) transmission this unique address of the RACU is appended to the digital information that is being transmitted. Upon learning this unique RACU address at the initial system setup (FIGS. 10, 11 and 12), the BACU will communicate with only this RACU, and not with another RACU that may be located in a nearby location.

RID Devices:

In FIG. 9, internal building blocks of a typical Remote Initiating Device (RID) (8) are shown; Main Control Unit (MCU) (28) is preferably a microprocessor and generally performs all the logic and control functions of the RID. The display (25) is used to give visual indications to the user, whereas user's interaction with the RID is accomplished by utilizing the switch inputs (26). The displays and switches are located at different positions on the body of the RID, depending on the nature, purpose and type of the RID being used. If an RID is not designed to be manually triggered then the RID will have some type of sensing circuitry (27) to detect the intended event or action in order to issue an alarm or emergency condition (such as smoke or fire detector, water level detector, carbon monoxide detector, etc.). For a fixed location type RID device, it is possible to have a power supply (24) that is connected to AC mains in order to provide power to the RID and also charge the standby batteries, in order to keep the RID working when AC mains power is interrupted. A portable RID device (such as a medical emergency pendant) has batteries to provide free movement within the premise and thus not connected to the AC mains. Batteries of these type devices have to be replaced after certain period of usage. A built-in RF transmitter (22) transmits the emergency or the alarm condition to the BACU or to the RACU. Again, variety of frequency modulation/demodulation techniques are common, and will not be detailed at this point.

During the manufacturing process, each of the RID devices is assigned with a unique digital address to uniquely identify these devices. This device address may be up to millions of different combinations of bits. This unique address information is stored in non-volatile memory of the RID and during the test or alarm transmission (6) this unique address of the RID is appended to the digital information that is being transmitted.

While the system is being setup, this unique RID address is learned and stored in the non-volatile memory of the BACU, as detailed in the following paragraphs. Then during normal operation of the system, the BACU will process on those RID information received where the address of the RID is already stored in the memory. All other RID signals that are not recorded at the time of learning will be completely ignored. These transmissions may be coming from a neighboring but a similar system.

Initial System Setup Procedure:

In a preferred embodiment of the system utilizing the present invention, the following paragraphs describe the steps that can be taken in order to properly setup the system. The general concept of Initial System Setup Procedure is shown in FIG. 10, whereas the details of the BACU initialization is shown in FIG. 11 and the details of the RACU initialization are shown in FIG. 12.

In FIG. 10, the BACU device is connected to at least one of the CMS communication media (PSTN, or cellular phone or long-range wireless link). The BACU is then powered up either by connecting it to the AC power mains, or by the use of internal standby battery. Then the BACU is placed into a "learn mode", by way of an example, by pressing the TEST switch on the BACU for 5 sec. When in learn mode, the BACU will learn the different RACU devices as well as different RID that will be introduced into the system.

Then one by one, each of the RACU devices are introduced into the system. Each new RACU is also placed into "learn mode", similar to the method described in previous paragraphs for BACU. Once in Learn mode, the TEST button on this RACU is pressed momentarily, upon which RACU sends "TEST button pressed" data packet to the BACU, via communication channel (9) and appends the 4 byte long unique device ID code to the message. The details of this data structure are shown in FIG. 13 and FIG. 14. The BACU in turn responds by sending BACU's own 4 byte long unique device ID code to the newly learned RACU. At this point, both BACU and RACU devices have detected and recorded the presence of each other. Opposite device ID codes are stored into nonvolatile memory. Once out of learn mode, both BACU and RACU will not respond to any communication packets received through channel (9), unless device ID codes received match to the device ID codes stored in the nonvolatile memory.

At this point, the BACU device assigns a unique "Unit number" to each of the RACU device learned. For example Un-2, Un-3, and so on. The BACU assumes the unit number Un-1. These numbers are what user sees on the BACU or RACU display. Even though, there is no theoretical limit to the number of RACU devices that can be introduced into the system, however, the maximum number of RACU devices in a typical household will not exceed single digit numbers.

In normal operation of the system, the BACU will display and also report to the CMS only these RACU unit numbers while reporting status information, such as AC power loss, Low battery, etc., as Un-1 (for BACU), Un-2 (for RACU-1), Un-3 (for RACU-2) and so on.

While all the RACU devices and BACU are still in the learn mode, then one by one, each of the RID devices are also learned into the system. The learning of the RID devices is accomplished either pressing a test button or alarm/emergency button on the RID. The unique address of the RID device is stored in the non-volatile memory of the BACU device, as they are learned. The system will act upon only on those RID devices that are learned into system. All other RID signals will be ignored.

All learned unique RID numbers are stored and maintained only in the nonvolatile memory of the BACU device. Any RACU devices will be transparent to the received RF signals from any RID device. In the proposed system implementation, each RACU device will delay the received RF signal from RID, for a fixed time before translating and resending it. This fixed delay is needed so that signals retransmitted by each RACU devices will not clash with each other. As a way of an example, RACU-1 will re-transmit all RID signals received after 20 msec delay, RACU-2 will re-transmit after 40 msec delay, RACU-3 after 60 msec, and so on.

At the end of the learn session, a BACU device has learned all the available RACU devices in the system, as well as all the available RID devices. Then with an appropriate switch entry sequence, for example by pressing the RESET button, all RACU devices and BACU devices are taken out of learn mode, into Normal Operation mode.

1. In Normal Operation mode, all RACU devices will transmit the following signals over the communication channel (9);
   i) User switch input status, alarm sensor status and system status of this RACU,
   ii) Translate and re-transmit RF signals received through channel (6) from RID, with "destination address" of the packet set to the "stored BACU ID address",
   iii) Re-transmit RF signals received through channel (9) from other RACU, if the "destination address" of the received signal matches with the "stored BACU ID". Otherwise ignore the received RF signal.

In Normal Operation mode, BACU performs same functionality on the information received through communication channel (9), as if this information is received directly through RF channel (6).

Finally, one skilled in the art will appreciate that the present invention can be practiced by other than the described embodiments, which are presented for purposes of illustration and not of limitation, and the present invention is limited only by the claims that follow.

The invention claimed is:

1. Alarm system for providing audio communications between a monitored location and a central monitoring station, comprising:

a. a first control unit having a radio transceiver, a speaker connected to a D/A converter, a microphone connected to an A/D converter, and a communicator for communicating with a central monitoring station;

b. a second control unit having a radio transceiver, a speaker connected to a D/A converter, a microphone connected to a A/D converter, and a communicator for communicating with a central monitoring station;

c. wherein, upon connecting the communicator of one of the first or second control unit to said central monitoring system, the connected first or second control unit functions as a base alarm control unit (BACU) and the non-connected first or second control unit functions as a remote alarm control unit (RACU);

d. wherein, said RACU utilizes said A/D converter for converting audio received by said microphone into a first digital signal and transmits via said radio transceiver said first digital signal to said radio transceiver of said BACU; and e. wherein, said BACU transmits via said radio transceiver a second digital signal, and said RACU receives said second digital signal with said radio transceiver of said RACU and said RACU utilizes said D/A converter for converting said second digital signal into an analog audio signal which is converted by said speaker into audible sound.

2. The alarm system of claim 1, further comprising:

a. remote initiating device (RID) having a transmitter which transmits status information; and b. wherein said RACU includes a receiver for receiving said status information from said RID and includes said status information in said first digital signal.

3. The alarm system of claim 1 wherein said first digital signal and said second digital signal are IEEE 802.15.4 compliant.

4. The alarm system of claim 1 wherein said communicator of said BACU communicates over a PSTN network to the central monitoring station.

5. The alarm system of claim 4 wherein said BACU further comprises a second D/A converter for converting said first digital signal to an analog signal to be transmitted over the PSTN network.

6. An alarm system of claim 1, further comprising a third control unit having a radio transceiver, wherein said radio transceiver receives said first digital signal and retransmits said first digital signal.

* * * * *